(12) United States Patent
Malki et al.

(10) Patent No.: US 9,476,472 B2
(45) Date of Patent: Oct. 25, 2016

(54) BRAKE

(75) Inventors: Refaat Malki, Gwent (GB); Martin Taylor, Gwent (GB)

(73) Assignee: Meritor Heavy Vehicle Braking Systems (UK) Limited, Cwmbran, Gwent (GB)

( * ) Notice: Subject to any disclaimer, the term of this patent is extended or adjusted under 35 U.S.C. 154(b) by 67 days.

(21) Appl. No.: 13/529,126

(22) Filed: Jun. 21, 2012

(65) Prior Publication Data

US 2012/0325596 A1 Dec. 27, 2012

(30) Foreign Application Priority Data

Jun. 22, 2011 (GB) .................................. 1110556.6

(51) Int. Cl.
*F16D 65/38* (2006.01)
*F16D 65/56* (2006.01)

(52) U.S. Cl.
CPC ........... *F16D 65/568* (2013.01); *F16D 65/567* (2013.01)

(58) Field of Classification Search
CPC ........ F16D 65/14; F16D 65/18; F16D 65/38; F16D 65/40; F16D 65/52; F16D 65/56; F16D 65/567; F16D 65/568; F16D 2125/18; F16D 2125/40
USPC .......... 188/71.7, 71.8, 71.9, 196 BA, 196 D, 188/196 F
See application file for complete search history.

(56) References Cited

U.S. PATENT DOCUMENTS

| | | |
|---|---|---|
| 4,276,968 A | 7/1981 | Cripe et al. |
| 5,101,938 A | 4/1992 | Eby |
| 5,449,052 A | 9/1995 | Macke et al. |
| 5,819,884 A | 10/1998 | Giering |
| 6,354,407 B1 * | 3/2002 | Heinlein et al. ............. 188/71.1 |
| 6,799,662 B1 | 10/2004 | Murdoch |
| 2003/0173164 A1 | 9/2003 | Angerfors |
| 2007/0158144 A1 | 7/2007 | Iraschko et al. |
| 2011/0147138 A1 * | 6/2011 | Jungmann et al. .......... 188/71.7 |

FOREIGN PATENT DOCUMENTS

| | | |
|---|---|---|
| DE | 202010003710 U1 | 7/2010 |
| EP | 0555682 A1 | 8/1993 |
| EP | 1441142 A1 | 7/2004 |
| EP | 2315966 A | 2/2010 |
| GB | 2442552 A | 4/2008 |
| WO | 9849458 A1 | 11/1998 |
| WO | WO 2010/017901 A1 * | 2/2010 |

OTHER PUBLICATIONS

European Patent Office, Extended Search Report for the corresponding European Patent Application No. 12170419.1 mailed Sep. 5, 2014.

(Continued)

*Primary Examiner* — Robert A Siconolfi
*Assistant Examiner* — Vu Q Nguyen
(74) *Attorney, Agent, or Firm* — Brooks Kushman P.C.

(57) ABSTRACT

A brake having an adjustable tappet for applying a brake force to a brake pad, a tappet having a rotating part in threaded engagement with a non-rotating part, the rotating part including a tappet gear, an adjuster mechanism for selectable rotating the tappet gear, the adjuster mechanism having a clutch with a driving clutch plate in frictional engagement with a driven clutch plate, the driven clutch plate having external teeth in direct meshing engagement with the tappet gear.

6 Claims, 6 Drawing Sheets

(56) References Cited

OTHER PUBLICATIONS

European Patent Office, Extended European Search Report for corresponding European Patent Application No. 15174712.8 mailed Nov. 11, 2015.

Habermann, Hruschka & Schnabel, Facts and Arguments/Opposition Reasoning for European Patent No. EP 2 538 104, dated Jun. 30, 2016.

European Patent Office, Notice of Opposition to a European Patent for corresponding European Patent No. 2 538 104 dated Jun. 30, 2016.

* cited by examiner

BRAKE

TECHNICAL FIELD

The present invention relates to a brake, in particular a brake for a heavy vehicle such as a lorry or truck.

BACKGROUND

Heavy vehicle brakes are known, for example EP1441142. Such brakes include a tappet assembly (in the case of EP1441142 two tappet assemblies) for applying a brake force to a brake pad. An operating shaft is rotatable about an axis which lies parallel to the brake disc plane. The operating shaft applies a force to one end of the tappet which in turn transmits that force to the brake pad. As the brake pads wear it is necessary for the length of the tappet to increase to compensate for the wear. An adjuster mechanism is provided to automatically adjust for brake pad wear. The adjuster mechanism is complicated since it has many components.

SUMMARY

The known adjuster mechanisms of EP1441142 includes a fork having fork tines which are engaged by a drive pin of the operating shaft. A clearance exists between the drive pin and the tines of the fork so as to ensure a running clearance between the brake disc and the brake pads. For an application requiring a greater running clearance, then the tines of the fork need to be spaced further apart than when a smaller running clearance is required. Different installations require different operating shafts. Typically different installations require a different design of lever arm of the operating shaft. Thus a series of adjuster mechanisms need to be made having fork tines separated by different distances and a series of different operating shafts need to be made in order to manufacture different types of brake caliper.

Because of the high number of brake applications, the fork tines and the drive pin typically need to be hardened in order to withstand the wear.

Known adjuster mechanisms include one way clutches having a wrap spring engaging a driven drum surface and a drive drum surface. Because the large number of times the brake is applied during its life the driven drum surface and the drive drum surface often need to be hardened in order to withstand the wear.

An object of the present invention is to provide a brake having an adjuster mechanism which is less expensive to produce and/or requires a fewer number of components.

Thus according to the present invention there is provided a brake having an adjustable tappet for applying a brake force to a brake pad, the tappet having a rotating part in threaded engagement with a non-rotating part, the rotating part including a tappet gear, an adjuster mechanism for selectably rotating the tappet gear, the adjuster mechanism having a clutch with a driving clutch plate in frictional engagement with a driven clutch plate, the driven clutch plate having external teeth in direct meshing engagement with the tappet gear.

Advantageously, by arranging for the external teeth of the driven clutch plate to be in direct meshing engagement with the tappet gear, then no further components are required to transmit the motion of the adjuster shaft to the tappet gear. In particular no clutch basket is required and no separate gear attached to that clutch basket is required.

According to a further aspect of the present invention there is provided a brake having an adjustable tappet for applying a brake force to a brake pad, an adjuster mechanism for selectably adjusting the tappet, the adjuster mechanism including one way clutch in the form of a wrap spring engaging a drive drum surface of a drive drum and engaging a driven drum surface of a driven drum, the drive drum including an integral drive pin for selectively rotating the drive drum.

Advantageously this allows for a common adjuster mechanism subassembly to be manufactured which can then be used in conjunction with different operating shafts wherein the running clearance of the brake can be defined by the width of the slot within which the drive pin sits on the differing operating shafts. In particular, for different installations, significantly different operating shafts may be required. Typically the slot of the operating shaft will be machined. Accordingly, the present invention provides for a common adjuster mechanism subassembly which can be used with a range of operating shafts for different vehicle installations. Because the running clearance of the brake is defined by the width of the slot in the different operating shaft, and where this slot is a machined slot, it becomes relatively easy to machine different width slots in the appropriate operating shafts to provide for different parts for differing vehicle installations. It will be appreciated that on different installations only the operating shaft need be changed.

BRIEF DESCRIPTION OF THE DRAWINGS

The invention will now be described, by way of example only, with reference to the accompanying drawings in which.

DETAILED DESCRIPTION

Figure 6:
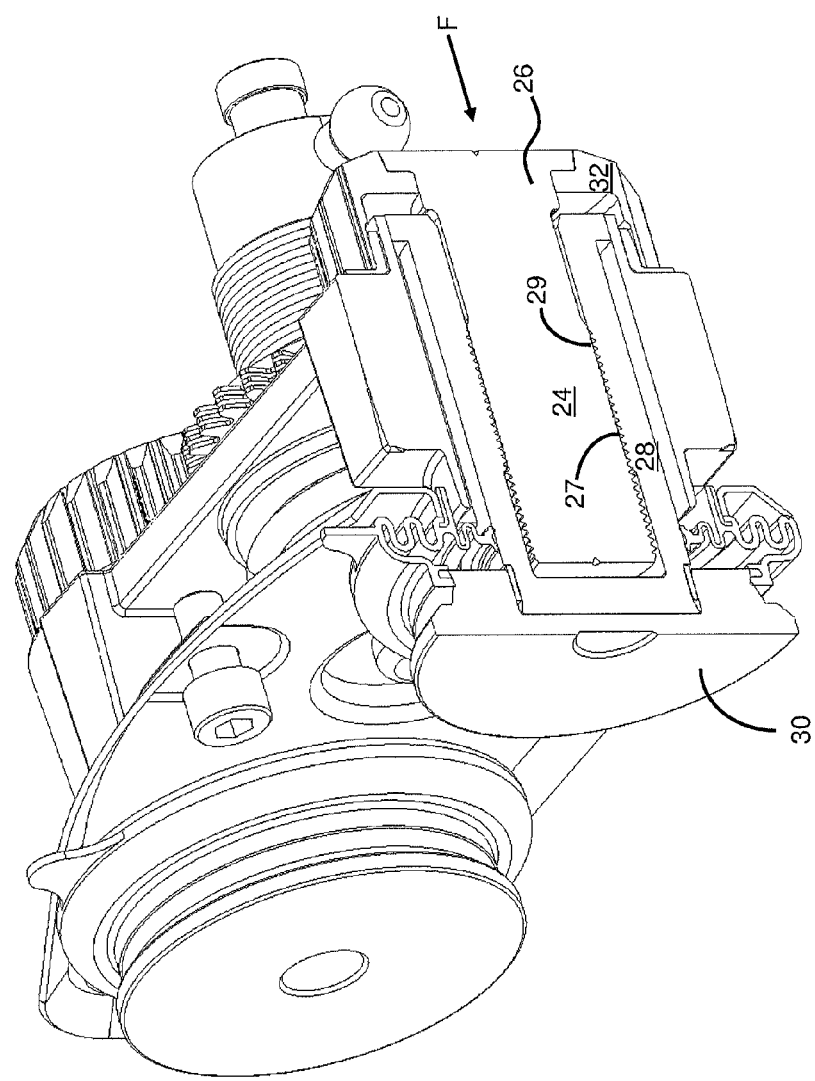
FIG. 6 shows a section view of a tappet of the brake of FIG. 1.

With reference to the drawings there is shown a brake 10 having a caliper housing 12 which is slideably mounted on a brake carrier (not shown). The carrier is typically mounted to suitable vehicle suspension components. The brake includes brake pads (not shown) for clamping a brake disc (not shown). An operating shaft 14 is rotatable about an axis 16 defined by bearings 18. Rollers 20 having roller axis 22 engage respective tappets 24, 24A. As shown in FIG. 6, tappet 24 has a rotating part 26 and a non-rotating part 28. The rotating part 26 has a male thread 27 threaded into female thread 29 of the non-rotating part 28. The non-rotating part 28 is connected to a head part 30 which engages the back plate of the brake pad. As will be appreciated, a force F applied by the respective roller 20 to the tappet 24 will be transmitted via the rotating part 26 and then via the non-rotating part 28 and then via the head part 30 to the brake pad. EP1441142 shows an example of a known brake wherein rotation of an operating shaft causes rollers to apply a force to a pair of tappets which in turn force a brake pad into engagement with a brake disc thereby applying the brake in a manner similar to brake 10.

As the brake pad wears, it is necessary to compensate for such wear by increasing the length of the tappets 24 and 24A. This is achieved by rotating the tappet gear 32 so as to rotate the rotating part 26 relative to the non-rotating part 28 thereby increasing the overall length of the tappet 24. Tappet 24A is identical to tappet 24. Accordingly, tappet 24A can be increased in length by rotating the tappet gear 32A.

The brake includes an adjuster 36 which automatically rotates the tappet gear 32 and 32A to adjust the length of the tappets.

Figure 3:
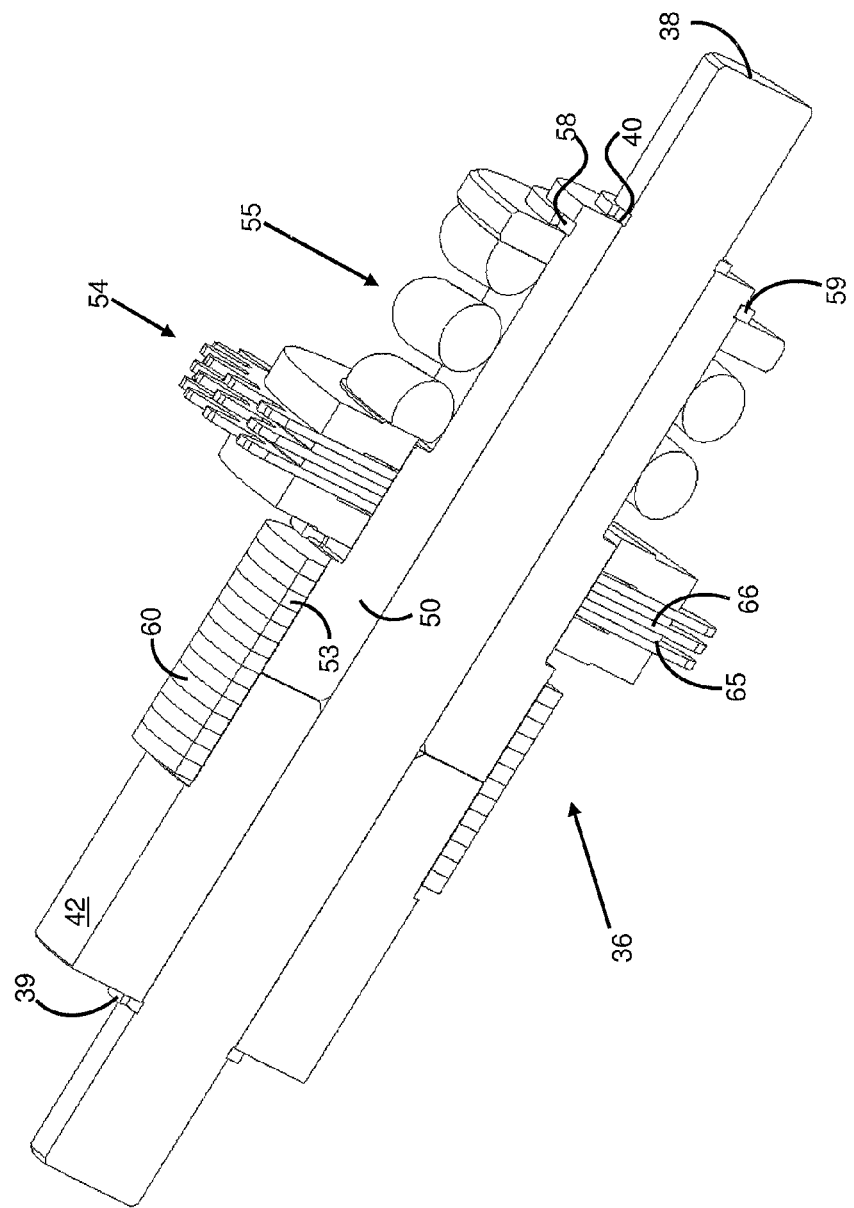
FIG. 3 shows a sectioned view of an adjuster mechanism subassembly of the brake of FIG. 1.
Figure 4:
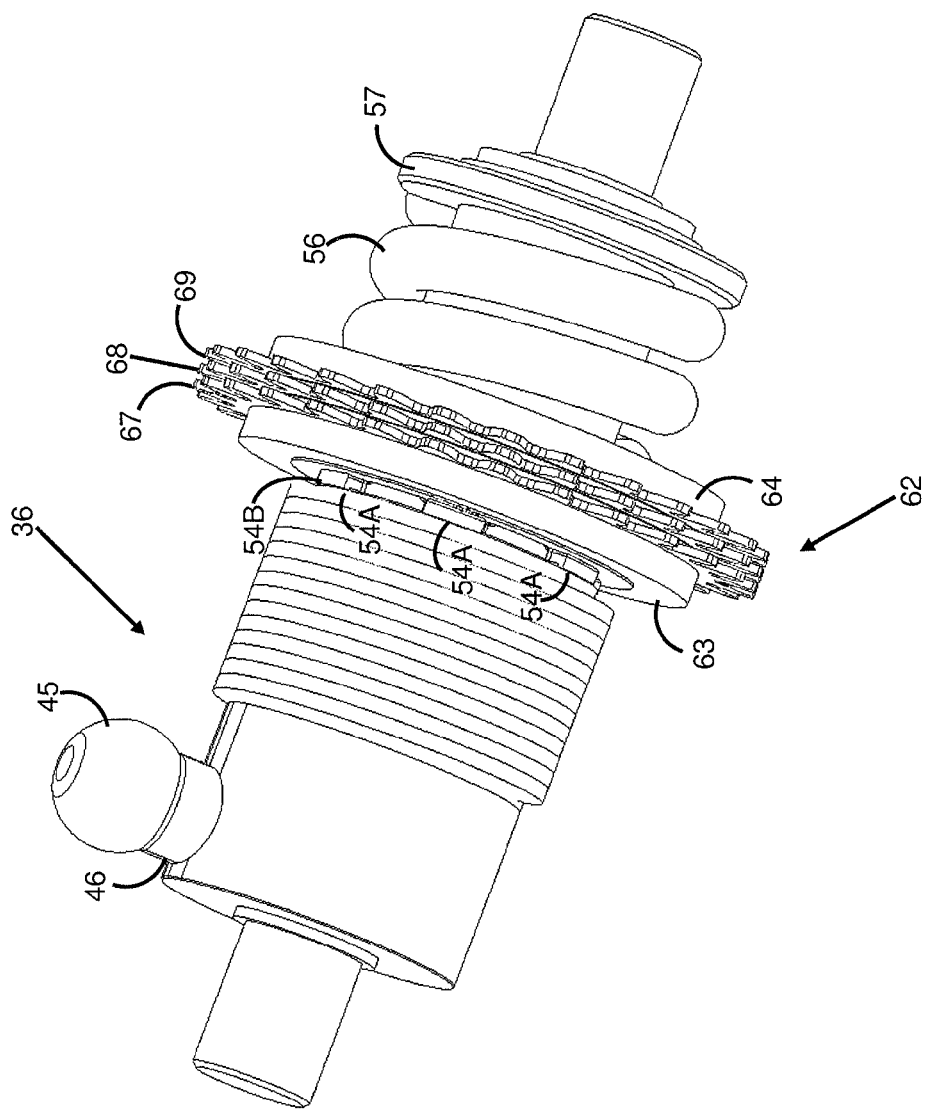
FIG. 4 shows the adjuster mechanism subassembly of the brake of FIG. 1.
Figure 5:
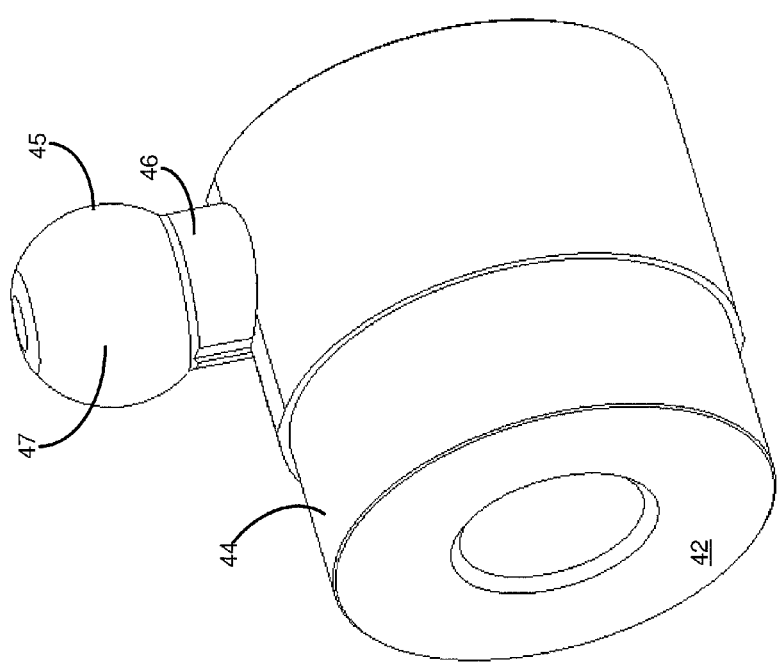
FIG. 5 shows a drive drum of the brake of FIG. 1.

FIGS. 3 and 4 show the adjuster mechanism in more detail. As shown in FIG. 4 the adjuster mechanism 36 is in the form of a subassembly. Shaft 38 is generally parallel sided but includes two circlip (snap ring) grooves 39 and 40. The adjuster mechanism includes a drive drum 42 and a driven drum 50. The drive drum 42 (best seen in FIG. 5) is generally cylindrical and includes a cylindrical drive drum surface 44. Projecting generally radially from the drive drum is a drive pin 45 which includes a generally cylindrical portion 46 and an end portion 47 which is part spherical.

The drive pin is integral with the drive drum, and in particular is integral with the drive drum surface 44. In one form the drive drum and drive pin will be manufactured as separate components and then attached together, for example by welding, braising, staking, press fitting or the like to form an integral component. The drive drum surface may be hardened prior to the drive pin being attached to the drive drum. The drive pin may be hardened prior to the drive pin being attached to the drive drum. All of the drive pin may be hardened prior to the drive pin being attached to the drive drum. Only part of the drive pin may be hardened prior to the drive pin being attached to the drive drum, in particular only an end portion of the drive pin may be hardened prior to the drive pin being attached to the drive drum.

Alternatively, the drive pin may be attached to the drive drum and then the drive drum surface and the drive pin may be hardened. The drive drum surface and drive pin may be hardened simultaneously, for example by case hardening or by induction hardening. Alternatively, after the drive pin has been attached to the drive drum then one of the drive pin or drive drum surface may be hardened and then the other of the drive pin or the drive drum surface may be hardened. This separate hardening of the drive drum surface and drive pin could be carried out by induction hardening.

Alternatively, the drive drum and drive pin can be made as a single component. For example, the drive drum and drive pin could be integrally machined from solid or the drive pin and the drive drum could be integrally cold formed or the drive pin and the drive drum could be integrally forged. However, if the drive pin and the drive drum are integrally formed then the drive pin and the drive drum surface can be subsequently hardened. The drive drum surface and the drive pin could be hardened simultaneously, for example by an induction hardening process or by a case hardening process. Alternatively, one of the drive drum surface and drive pin may be hardened, for example by an induction hardening process or by a case hardening process, and then subsequently the other of the drive drum surface and drive pin may be hardened, for example by a case hardening process or by an induction hardening process. The drive drum surface 44 may be hardened and the end portion 47 may be hardened. These portions may be hardened by an induction hardening process. These surfaces may be simultaneously hardened, especially via an induction hardening process. Alternatively, the surfaces can be simultaneously hardened by case hardening.

The driven drum 50 includes a central bore 52 for receiving the shaft 38. The driven drum includes a first portion 53, a second portion 54 and a third portion 55. The first portion 53 is cylindrical. The second portion 54 is castellated. The third portion 55 receives clutch spring 56 and washer 57.

A wrap spring 60 is part mounted on the drive drum 42 and engages the drive drum surface 44 and is part mounted on the driven drum 50 and engages the first portion 53 which forms a driven drum surface.

Mounted on the second portion 54 is a friction clutch 62. The friction clutch 62 includes first and second pressure plates 63 and 64 and intermediate drive plates 65 and 66. The friction clutch 62 also includes driven plates 67, 68 and 69.

The pressure plate 63 and 64 and intermediate drive plates 65 and 66 each have a set of female castellations on their inner periphery for engagement with the male castellation 54A of the second portion 54. As such the pressure plate 63 and 64 and intermediate drive plates 65 and 66 are rotatably fast with driven drum 50 but axially slideable thereon.

However, the driven plates 67, 68 and 69 all have a circular bore and are therefore rotatable relative to the driven drum 50. As can be seen in FIGS. 3 and 4, driven plate 67 is sandwiched between pressure plates 63 and intermediate drive plate 65. Driven plate 68 is sandwiched between intermediate drive plate 65 and intermediate drive plate 66. Driven plate 69 is sandwiched between intermediate drive plate 66 and pressure plate 64.

At an end remote from clutch spring 56, each castellation 54A includes a shoulder 54B against which pressure plate 63 abuts. The driven drum 50 includes a snap ring groove 58 within which sits a snap ring 59. As will be appreciated, when assembled as shown in FIG. 4 the clutch spring 56 is under compression and thereby clamps the friction clutch 62.

Figure 1:
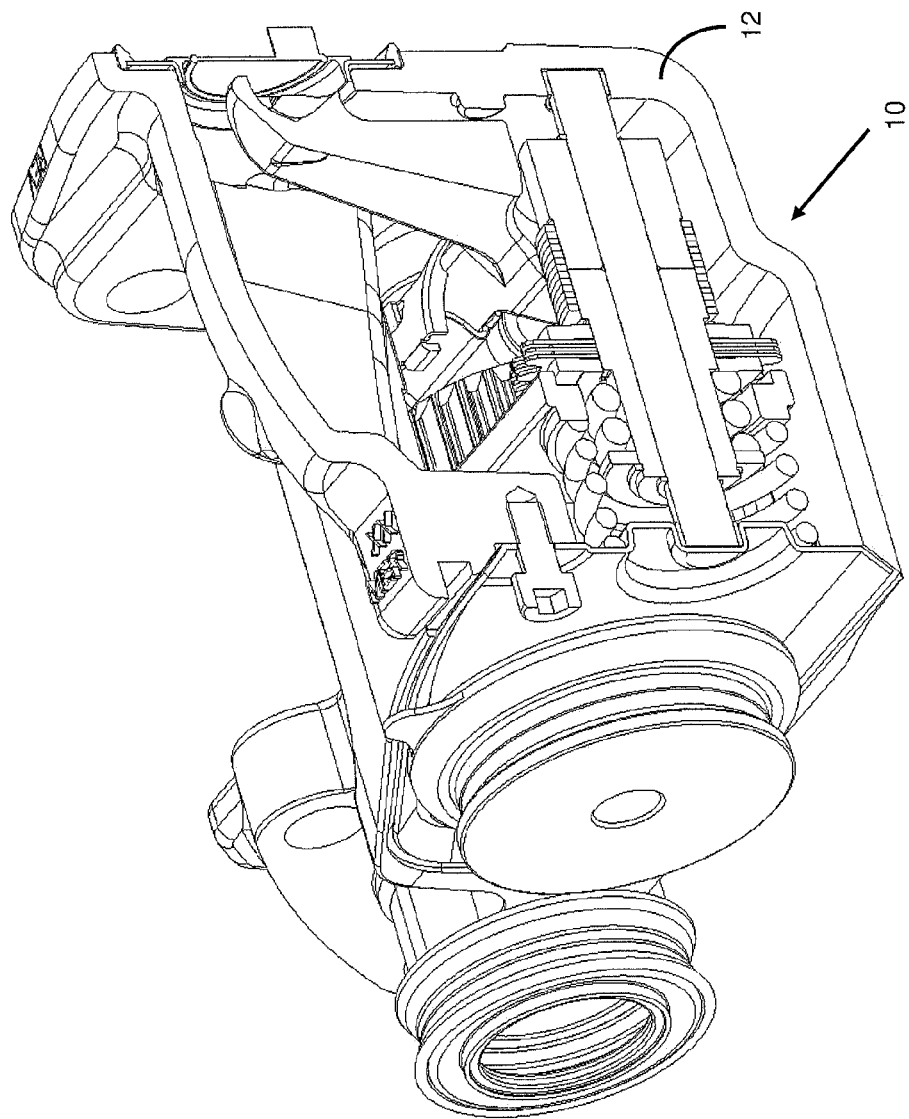
FIG. 1 shows a cut away of part of a brake according to the present invention.
Figure 2:
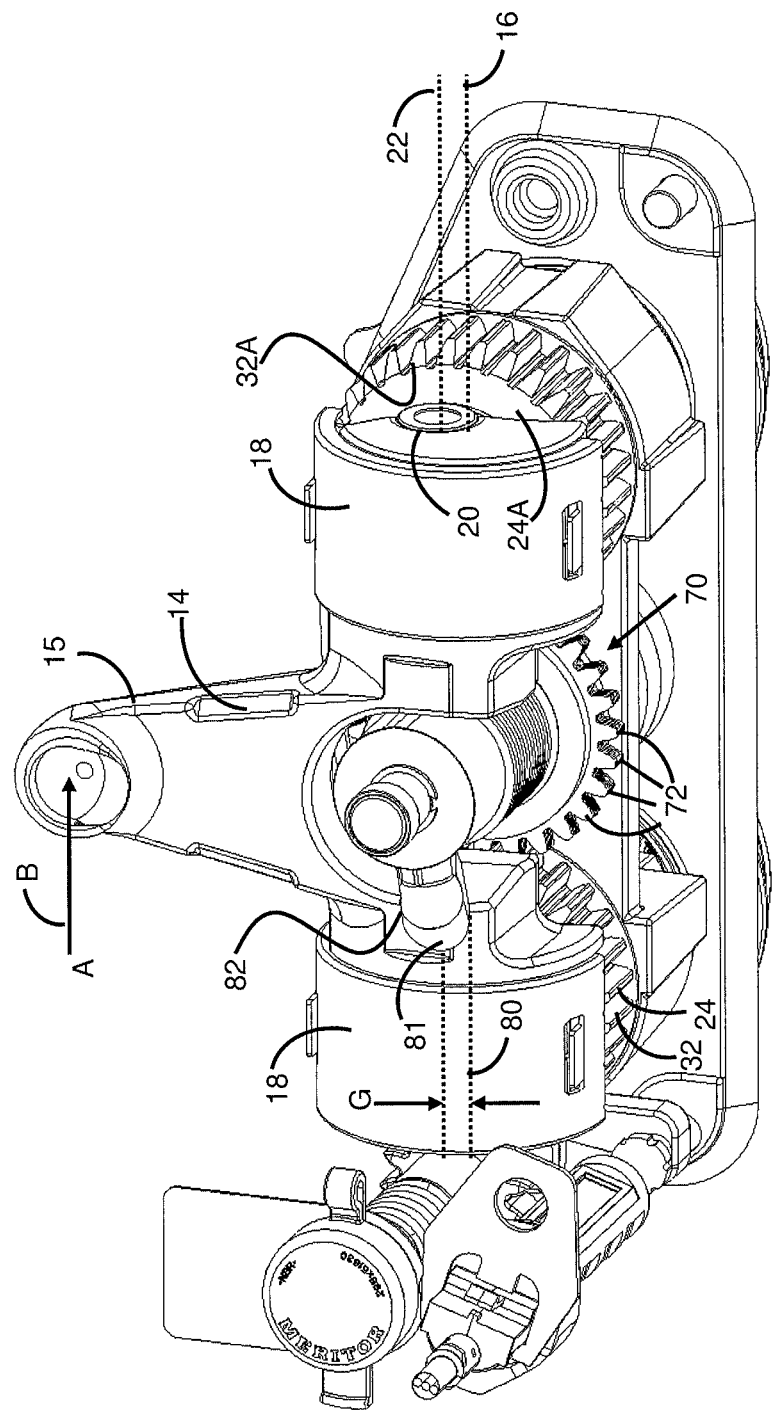
FIG. 2 shows an alternative view of part of the brake of FIG. 1.

Driven plate 67, 68 and 69 are all identical. Driven plate 67 includes an array of external teeth 70 around the circumference of the driven plate 67. As best seen in FIG. 2, each tooth 72 has an involute profile of similar profile to the involute profile of the teeth of the tappet gear 32 and 32A. As can be seen from FIG. 2, the array of external teeth 70 of the driven plates 67, 68 and 69 are in direct meshing engagement with the tappet gear 32.

As mentioned above and as can be seen from FIG. 2, the brake 10 includes a second tappet 24A which is identical to tappet 24. In particular, second tappet gear 32A is identical to tappet gear 32. As can be seen from FIG. 2, the array of external teeth 70 of the driven plate 67, 68 and 69 are also in direct meshing engagement with the second tappet gear 32A.

The operation of the adjuster mechanism is as follows.

For the initial explanation, it is assumed that the running clearance between the brake pads and the discs is correct, and as such no adjustment of the tappet assemblies is required.

FIG. 2 shows the brake in an "off" condition, and in particular a gap G exists between the edge 80 of slot 81 formed in the operating shaft 14 and the facing portion of the end portion 47 of the drive pin 45.

In order to apply the brakes a force A is applied to the end of the arm 15 of the operating shaft 14 in the direction of arrow B. This causes the operating shaft to rotate about axis 16 resulting in rollers 20 moving tappets 24 and 24A towards the brake disc. Under these circumstances, the brake pads engage the brake disc just before gap G closes. Continued application of the brake forces the brake pads into braking engagement with the brake disc thereby slowing the vehicle. This also causes the edge 80 to rotate the drive drum 42 clockwise when viewing FIG. 2. The wrap spring 60 is arranged such that clockwise rotation of the drive drum 42 causes clockwise rotation of the driven drum 50. Clockwise rotation of the driven drum 50 causes clockwise rotation of the pressure plate 63 and 64 and intermediate drive plate 65 and 66. However, because the brake pads are in engagement with the brake disc, it is not possible to adjust the tappets, i.e. it is not possible to rotate tappet gear 32 and tappet gear 32A. As such, the friction clutch 62 slips and the driven plate 67, 68 and 69 do not rotate.

Upon release of the brake, edge 82 of slot 81 drives the drive drum 42 back to the position shown in FIG. 2. However, the wrap spring 60 is arranged such that anticlockwise rotation of the drive drum 42 does not cause anticlockwise rotation of the driven drum 50. As will be appreciated, wrap spring 60 in conjunction with the drive drum 42 and driven drum 50 acts as a one way clutch.

For the following explanation it is now assumed that the running clearance between the brake pads and disc has increased, as a result of wear of the pads. Operation of the adjuster is as follows. Starting with the components at position shown in FIG. 2, a force A will again cause the operating shaft 14 to rotate about axis 16. However, because of the greater running clearance, gap G will close prior to the brake pads engaging the brake disc. Continued rotation of the operating shaft will cause clockwise rotation of the drive drum 42, which in turn will cause clockwise rotation of the driven drum 50 as described above. However, because the brake pads are not in engagement with the brake disc, then the friction clutch 62 will initially not slip and hence clockwise rotation of the pressure plates 63 and 64 and intermediate drive plates 65 and 66 will cause clockwise rotation of the driven plate 67, 68 and 69. This clockwise rotation of the driven plates in turn will cause the tappet gear 32 and second tappet gear 32A to rotate anticlockwise as shown in FIG. 2 which will result in a slight lengthening of tappet 24 and second tappet 24A thereby compensating for the wear on the brake pad. Upon release of the brake, the edge 82 will drive the drive drum 42 back to the position shown in FIG. 2. However, such anticlockwise rotation of the drive drum 42 does not cause anticlockwise rotation of the driven drum 50, and hence there is no anticlockwise rotation of the driven plate 67, 68 and 69 and no "de-adjustment" of the tappet gear 32 and second tappet gear 32A. Hence the slight increase in length of the tappet 24 and second tappet 24A that occur when the brake was applied remains when the brake is released.

As will be appreciated from the above, the friction between the male thread 27 and female thread 29 will depend upon whether or not the brakes are applied. Thus, when the brakes are off the friction between male thread 27 and female thread 29 is relatively low, but when the brakes are on the friction between the male thread 27 and female thread 29 will be relatively high. When the brakes are being applied, whether or not an adjustment of the length of the tappets takes place will depend upon the friction between the male and female threads at the point when gap G closes.

The driven plates 67, 68 and 69 may be stamped from sheet metal, in particular the external teeth may be stamped. Alternatively the driven plates may be moulded or sintered.

What is claimed is:

1. A brake comprising:
an adjustable tappet for applying a brake force to a brake pad so as to engage the brake pad with a brake disc, the tappet having a rotating part in threaded engagement with a non-rotating part, the rotating part including a tappet gear; and
an adjuster mechanism for selectably rotating the tappet gear, the adjuster mechanism having a clutch, the clutch including a driving clutch plate having an end face, a driven clutch plate that has an end face, and a clutch spring;
wherein the clutch spring is under axial compression and clamps the clutch such that the end face of the driving clutch plate is in frictional engagement with the end face of the driven clutch plate; and
wherein the driven clutch plate has external teeth in direct meshing engagement with the tappet gear.

2. The brake of claim 1 wherein the external teeth have a substantially involute gear profile.

3. The brake of claim 1 further comprising a second driven clutch plate that is spaced apart from the driven clutch plate.

4. The brake of claim 3 wherein the second driven clutch plate engages a second driving clutch plate that engages the clutch spring.

5. The brake of claim 1 further comprising a second adjustable tappet for applying a brake force to the brake pad, the second adjustable tappet having a second rotating part in threaded engagement with a second non-rotating part, the second rotating part including a second tappet gear, wherein the external teeth are in direct meshing engagement with the second tappet gear.

6. The brake of claim 1 wherein the driving clutch plate and the driven clutch plate extend around a shaft and wherein the adjuster mechanism further comprises a wrap spring that extends around the shaft, wherein the driving clutch plate and the driven clutch plate are disposed between the wrap spring and the clutch spring.

* * * * *